(12) United States Patent
Smith et al.

(10) Patent No.: US 11,221,809 B2
(45) Date of Patent: Jan. 11, 2022

(54) UNLOCKING CONSUMABLES

(71) Applicant: HEWLETT-PACKARD DEVELOPMENT COMPANY, L.P., Spring, TX (US)

(72) Inventors: Kenneth K. Smith, Boise, ID (US); Dean J Richtsmeier, Boise, ID (US); Doug Batten, Boise, ID (US); Mark J Wibbels, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/604,145

(22) PCT Filed: Jan. 31, 2018

(86) PCT No.: PCT/US2018/016316
§ 371 (c)(1),
(2) Date: Oct. 9, 2019

(87) PCT Pub. No.: WO2019/152033
PCT Pub. Date: Aug. 8, 2019

(65) Prior Publication Data
US 2020/0356325 A1 Nov. 12, 2020

(51) Int. Cl.
*G06F 3/12* (2006.01)
(52) U.S. Cl.
CPC .......... *G06F 3/1239* (2013.01); *G06F 3/1219* (2013.01); *G06F 3/1235* (2013.01)
(58) Field of Classification Search
CPC ..... G06F 3/1239; G06F 3/1219; G06F 3/1235

USPC ................................................. 358/1.1–1.18
See application file for complete search history.

(56) References Cited

U.S. PATENT DOCUMENTS

| | | | |
|---|---|---|---|
| 5,715,487 A | 2/1998 | McIntyre et al. | |
| 6,608,564 B2 | 8/2003 | Post et al. | |
| 9,229,363 B2 | 1/2016 | Thacker et al. | |
| 2004/0099733 A1 | 5/2004 | Brookner | |
| 2004/0101321 A1* | 5/2004 | Alegria | G03G 15/5016 399/24 |
| 2005/0060546 A1 | 3/2005 | Parry | |
| 2010/0272452 A1 | 10/2010 | Tsukijima | |
| 2012/0026545 A1 | 2/2012 | Miura | |
| 2012/0027423 A1 | 2/2012 | Kawai | |
| 2014/0267719 A1* | 9/2014 | Akdogan | B01D 53/261 348/143 |
| 2015/0370518 A1 | 12/2015 | Ramchandran | |
| 2017/0230540 A1 | 8/2017 | Sasaki | |

* cited by examiner

*Primary Examiner* — Gabriel I Garcia
(74) *Attorney, Agent, or Firm* — HP Inc. Patent Department (57) ABSTRACT

Examples disclosed herein relate to unlocking consumables of imaging devices. Example imaging devices include a lock to secure a consumable to the imaging device. A feedback engine of the imaging device may selectively generate a signal in response to an actuation event to control a component to indicate the consumable is secured. A lock control engine of the imaging device may determine if the actuation event is approved to unlock the consumable. A release engine of the imaging device may disengage the lock in response to approval of the actuation event.

14 Claims, 9 Drawing Sheets

```
CONSUMABLE REPLACEMENT NOTIFICATION                    ─── 709A

CONSUMABLE ID #1
                78913956

CONSUMABLE ID #2
                78913956

CONSUMABLE LEVEL INFORMATION ID #1
   REMAINING TONER IN CARTRIDGE ID 78913956: 3000 PAGES

CONSUMABLE LEVEL INFORMATION ID #2
   REMAINING TONER IN CARTRIDGE ID 78913956: 3000 PAGES
```

FIG. 7A

```
CONSUMABLE REPLACEMENT NOTIFICATION                    ─── 709B

CONSUMABLE ID #1
                89415894

CONSUMABLE ID #2
                78899178

CONSUMABLE LEVEL INFORMATION ID #1
   REMAINING TONER IN CARTRIDGE ID 89415894: 150 PAGES

CONSUMABLE LEVEL INFORMATION ID #2
   REMAINING TONER IN CARTRIDGE ID 78899178: 3000 PAGES
```

UNLOCKING CONSUMABLES

BACKGROUND

Printing technology has evolved so much over the last few decades that customers now expect excellent cost management from their imaging devices, such as laser, ink-based, and 3D models. Due to these high expectations, customers have begun to design their workflows to pay attention to the quantity of consumables, such as printing materials (e.g., toner, ink, powder, and media), used to avoid waste.

BRIEF DESCRIPTION OF THE DRAWINGS

The following detailed description references the drawings, wherein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

An "imaging device" may be a hardware device, such as a printer, multifunction printer (MFP), or any other device with functionalities to physically produce representation(s) (e.g., text, images, models, etc.) on a medium. In examples, a "medium" may include paper, photopolymers, thermopolymers, plastics, textile, composite, metal, wood, or the like. In examples, a "deposition material" may refer to any material to be deposited by an imaging device. In examples, an imaging device may use a deposition material to produce representation(s) on the medium. In such an example, deposition materials may include inks, toners, plastics, polymers, powdered metals, alloys and the like. In other examples, deposition materials may include materials deposited on the medium but not visible to a user, such as invisible, ultraviolet, or white colored inks, toners, plastics, polymers, powdered metals, alloys and the like. In yet other examples, deposition materials may include materials used for cleaning or servicing of components. In examples, "printing materials" may include deposition materials, media, and any other material consumed by a printer.

In some examples, an MFP may be capable of performing a combination of multiple different functionalities such as, for example, printing, photocopying, scanning, faxing, etc. For example, the function within an imaging device may be to reboot the imaging device, troubleshoot the imaging device, upgrade firmware, retrieve consumable level information, clone features, adjust security settings, perform a test, retrieve a scan, execute a print request, clear an alert, etc.

A number of imaging devices lock or secure access to a consumable. As used herein, the term "consumable" refers to any printing material of an imaging device and any container to store such printing material. In some examples, the consumable may contain deposition materials. In some examples, imaging devices may be part of a service contract or subscription plan subscribed to or entered into by the user of the imaging device. For example, as part of a subscription plan, a user may agree to pay a fee to rent or lease an imaging device for a certain duration of time. In another example, a user may subscribe to a service contract for a purchased imaging device through which a service technician is available to perform maintenance and/or repairs of the imaging device. The replacement of consumables of an imaging devices, such as deposition materials, may be built into the cost of some service plans and subscription plans. The premature replacement of consumables before the depletion of all materials therein, such as consumables still containing deposition materials, may increase operating costs for an imaging device as any consumables remaining in the consumable may be wasted. The premature replacement of consumables may also increase the environmental impact of such consumables.

To address these concerns, a number of imaging devices have been developed that lock or secure access to consumables until a consumable is depleted. However, some users may not have previously encountered a locked consumable and may be confused by the inability to access a portion of the imaging devices which may have been accessible previously. For example, locking access to the consumable may make it difficult to clear a paper jam or trouble shoot the imaging device. Some users may damage the imaging device by attempting to access the locked consumable. Some imaging devices may hide or obscure access to a locked consumable to prevent users from damaging the imaging device. However, user confusion at an inaccessible or hidden consumable may result in frustration which may erode the user experience, increase the rate of calls for customer support, and/or create negative impressions of the provider of the service contract/subscription and/or the manufacturer of the imaging device.

To address these issues, in the examples described herein, an imaging device is described which may provide selective access to a locked or secured consumable in response to an attempt to access the consumable. In examples, the imaging device may provide feedback to a user that a consumable is locked. In some examples, a user may be prompted to request access to the consumable and be provided with access according to various criteria. In this manner, examples described herein may increase user satisfaction with imaging devices.

In examples, the imaging device may detect an attempt to access a secured or locked consumable and in response provide feedback that the consumable is locked. In examples, the feedback may be used to indicate that a consumable is locked and to explain why the consumable is locked. In some examples, the feedback may explain how to request access to the consumable. In examples, the imaging device may determine whether to provide access to the consumable and unlock the consumable accordingly. In examples, the imaging device may determine whether to provide access according to a variety of policies, permissions, and/or restrictions on providing access to the consumable whether locally stored on the imaging device or provided by a remote system.

In some examples, the imaging device may monitor whether a consumable has been replaced. In examples, the imaging device may determine whether a replaced consumable contained any useable or useful printing material and may provide feedback of a premature replacement of a consumable. In such examples, a user may be able to reinstall any prematurely replaced consumable to avoid waste. Further, in such examples, a service provider may be able to monitor and/or incentivize the use of consumables until depleted.

Figure 1:
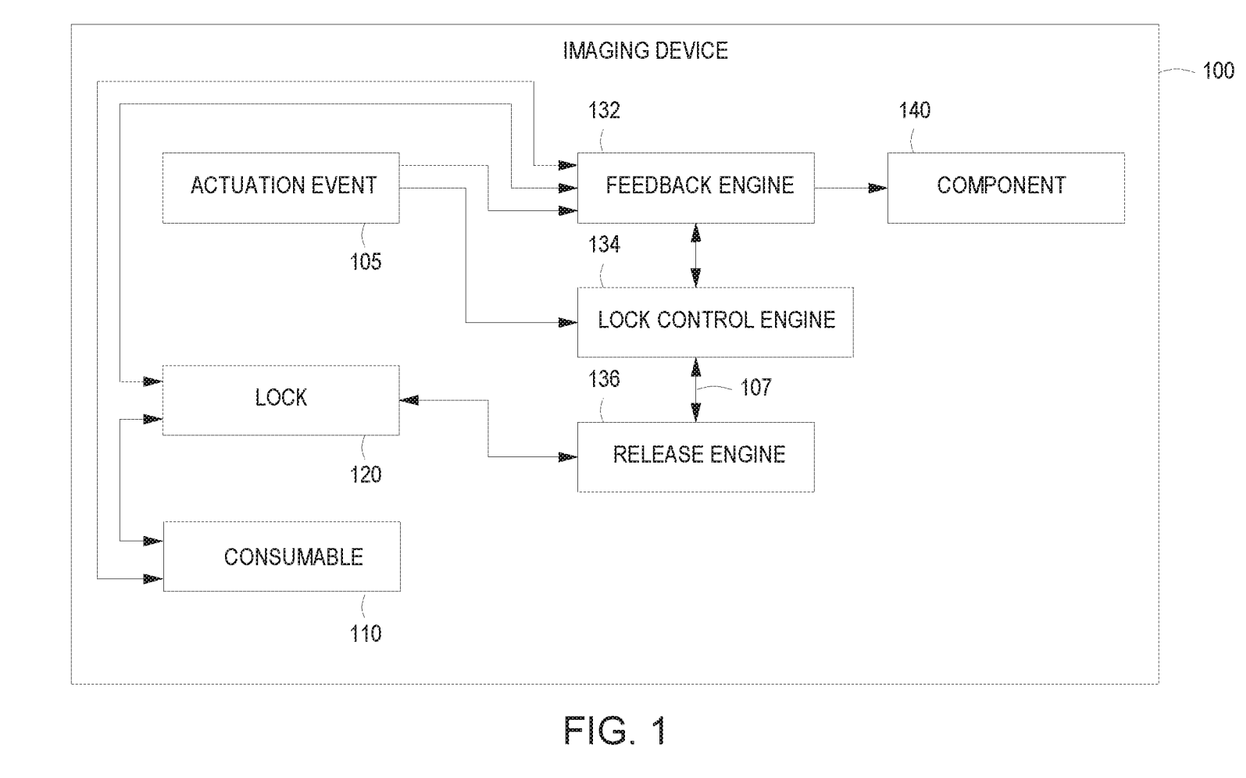
FIG. 1 is a block diagram of an example imaging device.

Referring now to the drawings, FIG. 1 is a block diagram of an example imaging device 100. In examples, imaging device 100 may include a lock 120, a feedback engine 132, a lock control engine 134, and a release engine 136, and a component 140. In examples, imaging device 100 may be coupled to a consumable 110. In examples, the term "couple," "coupled," and/or "couples" is intended to include suitable indirect and/or direct connections. Thus, if a first component is described as being coupled to a second component, that coupling may, for example, be: (1) through a direct electrical or mechanical connection, (2) through an indirect electrical or mechanical connection via other devices and connections, (3) through an optical electrical connection, (4) through a wireless electrical connection, (5) a communicative connection, and/or (6) another suitable coupling. In contrast, the term "connect" or "connects" is intended to include direct mechanical and/or electrical connections. In examples, imaging device 100 may include multiple consumables for different types of printing materials. For example, imaging device 100 may include a consumable chosen among a black colored deposition material, a magenta colored deposition material, a cyan colored deposition material, a yellow colored deposition material, a binding material, a cleaning material, a curing material, a drying material, etc.

In examples, imaging device 100 may include a lock 120 to secure or lock consumable 110 to imaging device 100. In examples, a "lock" refers to any mechanism(s) or coupling(s) by which a first object may be fastened to a second object and that includes a locked state. A consumable may be considered in a "locked state," "locked," or "secured" when a mechanism is engaged to secure the consumable to the imaging device. In other words, a lock prevents, restricts, or inhibits access to the consumable. In examples, the terms "unlock" or "unlocking" a lock refer to a mechanism to disengage a lock to unsecure the consumable such that the consumable may be removed or uncoupled from the imaging device. In examples, a consumable may be locked or in a locked state according to policies, permissions, and/or restrictions provided in a service contract or subscription plan. In such an example, an imaging device may include sensors, detectors, controllers, engines, and/or other mechanisms by which to determine whether a consumable is empty. In examples, lock 120 may be a mechanical lock coupled to mechanically engage consumable 110 to couple with imaging device 100. In other examples, lock 120 may be a magnetic component to magnetically couple consumable 110 with imaging device 100. In yet other examples, lock 120 may be an electrical component to form an electrical connection to electrically couple consumable 110 with imaging device 100. In examples, lock 120 may secure/unsecure, fasten/unfasten, and/or lock/unlock an intermediate component to access a consumable, such as a door, a handle, a lever, etc. In some examples, lock 120 may provide an indication of a locked state to other components of imaging device 100. In other examples, other components of imaging device 100 may determine whether lock 120 is engaged to lock consumable 110 to imaging device 100. In such examples, an imaging device may include sensors, detectors, controllers, engines, and/or other mechanisms by which to determine whether a consumable is locked.

In examples, imaging device 100 may selectively secure/unsecure, fasten/unfasten, or lock/unlock consumable 110 in response to certain parameters. In examples, the parameters may be policies, permissions, and/or restrictions from a service contract or subscription plan. Such parameters may specify when a consumable coupled to an imaging device may be unlocked, disengaged, or released and under what conditions. For example, a service contract or subscription plan may specify that a consumable coupled to an imaging device remain locked while it contains greater than a specific amount of printing materials or any printing material. In other examples, a service contract or subscription plan may specify how many times in a given period a user may access a consumable containing printing materials, i.e., a non-empty consumable. In another example, a service contract or subscription plan may include a duration of time (e.g., 15 minutes) for which access to a non-empty consumable may be provided. In such examples, a user may uncouple consumable 110 from imaging device 100 during the specified time period. In other words, a service contract or subscription plan may specify that any access provided to consumable 110 may time out. In some examples, a service contract or subscription plan may specify that a locked consumable is accessible for a fee. In one such example, any such additional fee may be refundable if the same consumable is returned to the imaging device rather than being replaced with a different consumable. In such examples, a service provider or subscription plan may incentivize a user to use a consumable until it is empty rather than prematurely replacing the consumable with a replacement consumable.

In examples, imaging device 100 includes at least engines 132, 134, and 136 which may be any combination of hardware and programming to implement the functionalities of the engines. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 132, 134, and 136. In such examples, imaging device 100 may include the machine-readable storage medium storing the instructions and the processing resource to execute the instructions, or the machine-readable storage medium may be separate but accessible to imaging device 100 and the processing resource.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In some examples, the instructions can be part of an installation package that, when installed, can be executed by the processing resource to implement at least engines 132, 134, and 136. In such examples, the machine-readable storage medium may be a portable medium, such as a CD, DVD, or flash drive, or a memory maintained by an imaging device from which the installation package can be downloaded and installed. In other examples, the instructions may be part of an application, applications, component, or components already installed on imaging device 100 including the processing resource. In such examples, the machine-readable storage medium may include memory such as a hard drive, solid state drive, or the like. In other examples, the functionalities of any engines of imaging device 100 may be implemented in the form of electronic circuitry.

In the example of FIG. 1, feedback engine 132 may selectively generate signals to control component 140 in response to an actuation event 105. In such examples, feedback engine 132 may selectively generate signals to control component 140 when consumable 110 is locked. In examples, imaging device 100 may include any number of sensors or detectors to detect actuation event 105 and to provide actuation event 105 to feedback engine 132. In some examples, feedback engine 132 may determine whether consumable 110 is locked by communicating with lock 120 and/or consumable 110. In examples, an "actuation event," "consumable unlock event," or "unlock event" may refer to an attempt to access a consumable whether directly or indirectly. For example, an actuation event or consumable unlock event may occur when a user actuates a mechanism by which access to consumable 110 may be provided in imaging device 100. In examples, the mechanism by which access to a consumable may be provided may include a door, a button, a handle, etc. In examples, the door to consumable 110 may be a door that directly provides access to consumable 110 or an intermediate door that provides access to another part of imaging device 100 from which consumable 110 may be accessed. In examples, a button may be a physical button or a virtual button, such as a button displayed on a display, to directly or indirectly provide access to consumable 110. For example, the button may open a hatch or door to access consumable 110. In examples, the handle may be a handle that directly provides access to consumable 110 or an intermediate handle that provides access to another part of imaging device 100 from which consumable 110 may be accessed.

In examples, component 140 may be any component to provide user feedback. In examples, component 140 may be chosen from a speaker, a display, a light source, a vibrating component, or combinations thereof to provide feedback or instructions to a user. In examples, a speaker may output an audible signal or instructions to a user to inform them that consumable 110 is locked. In some examples, the audible signal or instructions may instruct or indicate to a user to look at a display or other parts of an imaging device containing further instructions. In examples, a display may display a graphical user interface or other visual signal through which a user may receive instructions and/or prompts through which to interact with imaging device 100. In examples, a light source may be any type of light emitting device coupled to imaging device 100 to be visible to a user. In examples, the light source may blink or change colors to indicate to a user that consumable 110 is locked. In some examples, the light source may illuminate a cutout or other indicator of a locked state of consumable 110. In examples, a vibrating component may provide a haptic signal to a user to indicate a locked state of consumable 110. In such an example, the vibrating component may vibrate to indicate to a user that consumable 110 is locked. For example, a vibrating component may be disposed to vibrate a mechanism used to access consumable 110 such as a door, a handle, a button, etc. In some examples, component 140 may further provide feedback on why a consumable is locked and how access to the consumable may be obtained. In such a manner, user confusion may be reduced which may increase user satisfaction with an imaging device.

In examples, lock control engine 134 may determine whether actuation event 105 is approved to unlock consumable 110. In examples, lock control engine 134 may determine whether to approve actuation event 105 according to a variety of factors. In examples, lock control engine 134 may generate or provide a disengage authorization 107 to release engine 136. A "disengage authorization" may refer to instructions to approve an actuation event and may include further parameters regarding the terms of access to a consumable. In examples, the lock control engine 134 may determine actuation event 105 is approved according to policies, permissions, and/or restrictions provided in a service contract or subscription plan subscribed to or entered into by a user of imaging device 100. For example, a policy may allow access to the consumable for 15 minutes every week for cleaning. In another example, a permission may allow a technician or maintenance work access to an imaging device. In yet another example, a restriction may restrict access to a non-empty consumable coupled to an imaging device unless specific permission is granted to access the consumable by a remote system. In some examples, lock control engine 134 may determine actuation event 105 is approved according to information stored locally on imaging device 100. In such an example, lock control engine 134 may determine disengage authorization 107 according to policies, permissions, or restrictions stored in a non-volatile memory of imaging device 100. In other examples, lock control engine 134 may receive (either passively (e.g., acquire) or actively (e.g., retrieve)) approval of actuation event 105 from a remote device or remote system. In one such example, lock control engine 134 may receive disengage authorization 107 from the remote system. In other examples, lock control engine 134 may receive or access policies, permissions, or restrictions stored in a remote device or remote system to determine whether to approve actuation event 105. In examples, imaging device 100 may include a communication unit or communication components to communicate with a remote device or remote system.

In an example, lock control engine 134 may determine actuation event 105 is not approved to access consumable 110 according to a variety of factors. In examples, lock control engine 134 may determine an actuation event is not approved according to policies, permissions, and/or restrictions provided in a service contract or subscription plan subscribed to or entered into by a user of imaging device 100. In such an example, lock control engine 134 may provide feedback engine 132 notification of the determination to not approve actuation event 105. In such an example, feedback engine 132 may control component 140 of imaging device 100 to provide feedback that access to consumable 110 is denied via visible feedback, audible feedback, haptic feedback, or combinations thereof. In some example, feedback engine 132 may further control component 140 to provide feedback of options by which to request access to consumable 110. For example, in response to determining an actuation event to access a non-empty consumable is not permitted according to a service plan or subscription plan, components of imaging device 100 may provide the option to gain access to consumable 110 for an additional fee. For example, a display may provide a graphical representation of a button to request access to consumable 110 along with a warning that access to a consumable may result in incurring an additional fee. In such an example, the additional fee may be refundable if consumable 110 is returned to imaging device 100 without being replaced.

In examples, release engine 136 may unlock or disengage lock 120 in response to approval of actuation event 105. In an example, release engine 136 may disengage lock 120 in response to receipt of disengage authorization 107. In examples, consumable 110 may be uncoupled from imaging device 100 when lock 120 is disengaged or unlocked. In other words, release engine 136 may control lock 120 to selectively provide access to uncouple consumable 110 from imaging device 100. In examples, release engine 136 may receive (either passively (e.g., acquire) or actively (e.g., retrieve)) disengage authorization 107 from lock control engine 134. In examples, release engine 136 may control lock 120 to provide access to consumable 110 according to parameters provided in disengage authorization 107, such as, a specific duration of time. In such an example, a user may access consumable 110 to uncouple from imaging device 100 during the specified duration of time.

Figure 2:
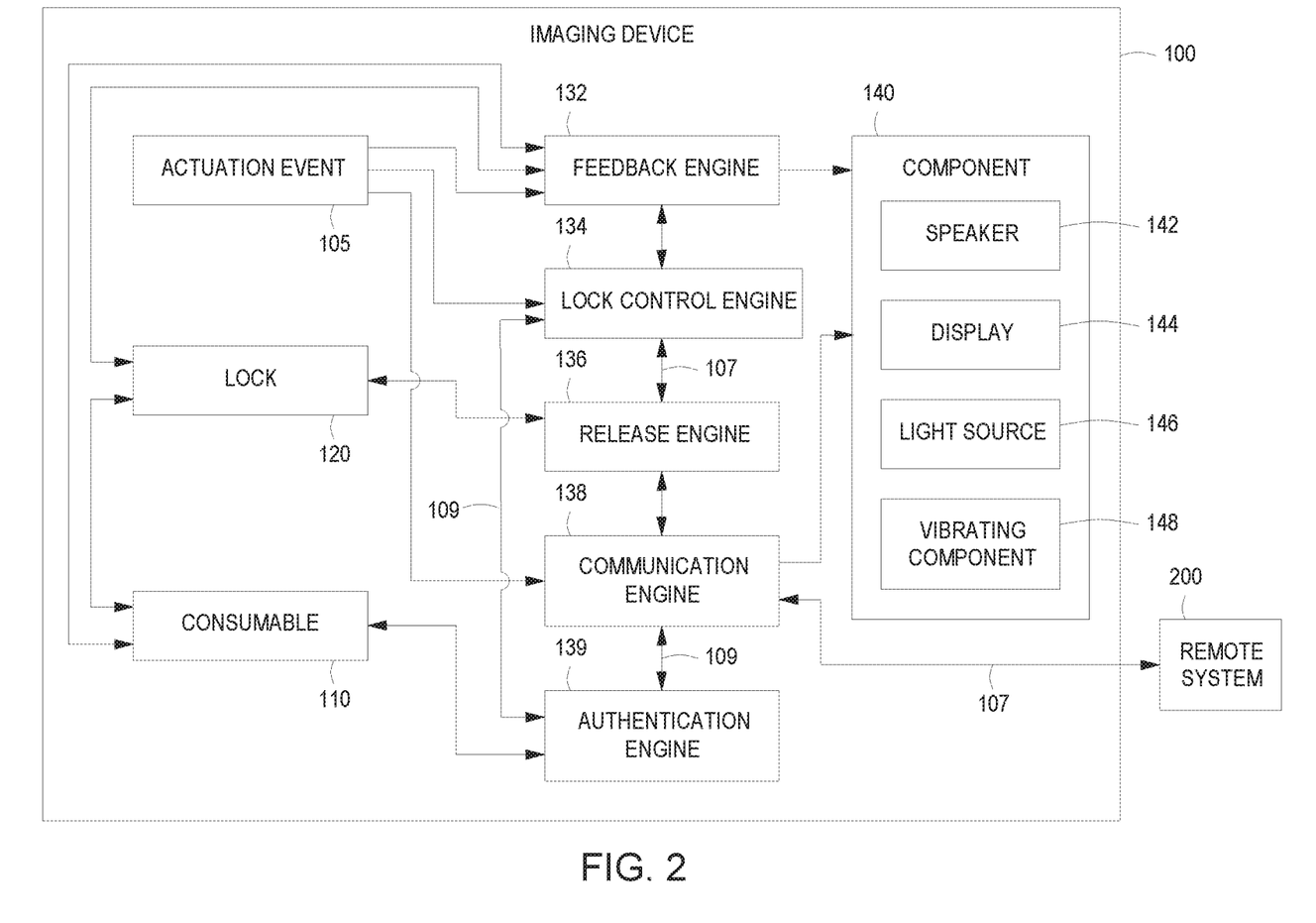
FIG. 2 is a block diagram of an example imaging device including possible additional example components of the imaging device of FIG. 1.

FIG. 2 is a block diagram of an example imaging device including possible additional example components of imaging device 100 of FIG. 1. Additional components may include communication engine 138, authentication engine 139, speaker 142, display 144, light source 146, and vibrating component 148. Communication engine 138 and authentication engine 139 may be any combination of hardware and programming to implement the functionalities of engines as described above with reference to engines 132, 134, and 136 of FIG. 1.

A communication engine 138 may be used to communicate with a remote system 200. In examples, remote system 200 may include a device or component to communicate with communication engine 138 through any communication protocol (e.g., Transmission Control Protocol (TCP) and the Internet Protocol (IP), WiFi, WiFi Direct, Bluetooth, etc.) In examples, communication engine 138 may communicate detection of actuation event 105. In such an example, communication engine 138 may receive a disengage authorization 107 from remote system 200 in response to communication of the actuation event 105. In another such example, communication engine 138 may receive updated policy, permission, and/or restriction information from remote system 200 from which lock control engine 134 may determine whether to approve actuation event 105. In other examples, communication engine 138 may communicate information received from component 140. For example, communication engine 138 may communicate to remote system 200 a request for additional information about fees incurred for accessing consumable 110 received from display 144.

In examples, authentication engine 139 may determine whether a consumable has been replaced in imaging device 100. In examples, authentication engine 139 may control or communicate with any sensor, detector, or engine to determine whether a consumable has been replaced. For examples, authentication engine 139 may determine a consumable has been replaced by comparing consumable identification information provided by a consumable to previously stored values. In examples, authentication engine 139 may provide a "consumable replacement notification" 109. In examples, a consumable replacement notification refers to a notification to provide information about the replacement status of a consumable coupled to an imaging device. In examples, the consumable replacement notification may indicate whether a consumable has been replaced in an imaging device. In some examples, a consumable replacement notification may be provided or generated by authentication engine 139 after access to consumable 110 has been provided by release engine 136.

In some examples, a consumable replacement notification may further include "consumable level information" about a consumable. As used herein, "consumable level information" refers to information to indicate an amount of printing material in a consumable and any other information about a consumable captured by an imaging device. In an example, consumable level information may indicate whether a consumable is empty. In such an example, consumable level information may indicate an amount of remaining printing material in a consumable. In examples, consumable level information may be provided by consumable 110 to authentication engine 139. In other examples, consumable level information may be determined by monitoring usage of printing material used by imaging device 100. For example, any number of sensors, detectors, and/or engines may monitor usage of printing material, for example, by counting a number of pages printed.

In examples, authentication engine 139 may provide consumable replacement notification 109 to lock control engine 134. In such examples, lock control engine 134 may determine whether further feedback should be provided to a user about any replaced consumable according to policies, permissions, and restrictions accessible to lock control engine 134. In one such example, lock control engine 134 may provide feedback engine 132 with instructions to control display 144 to display a graphical user interface with a warning that a non-empty consumable has been replaced. In other examples, authentication engine 139 may provide consumable replacement notification 109 to communication engine 138 for communication or sending to remote system 200. In one such example, remote system 200 may provide instructions for any additional feedback to be provided by component 140 via communication engine 138.

Figure 7A:
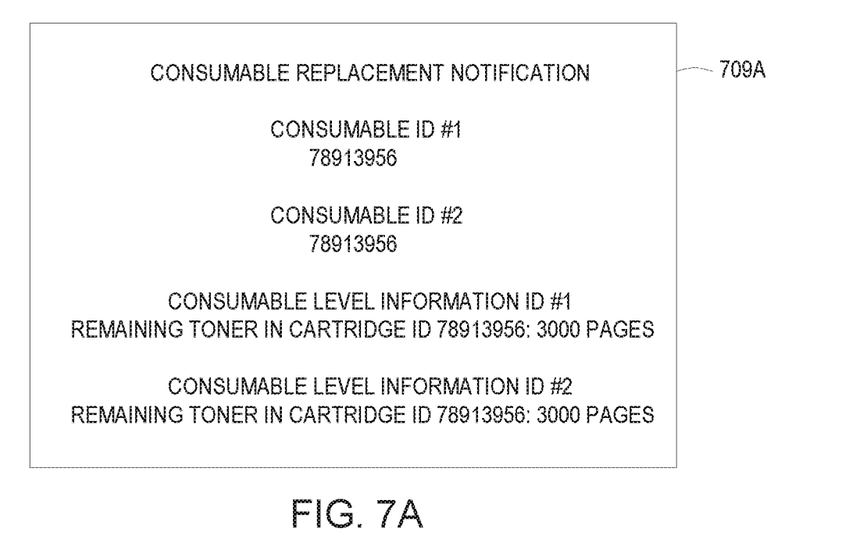
FIGS. 7A-7B are examples of consumable replacement notifications of an example imaging device.

FIGS. 7A-7B are examples of consumable replacement notifications of an example imaging device. In the example of FIG. 7A, a consumable replacement notification 709A includes consumable identification numbers and consumable level information for a first consumable and a second consumable. In examples, the first consumable may be a consumable initially coupled to an imaging device and a second consumable may be a consumable coupled to the imaging device after a release engine disengages a lock of the imaging device providing access to the consumable. In the example of FIG. 7A, the first consumable and the second consumable appear to be the same consumable because the consumable identification numbers appear to match. In some examples, an imaging device may provide the consumable replacement notification to a remote system. In one such example, the imaging device may provide the consumable replacement notification to a remote system when a consumable has been replaced.

Figure 7B:
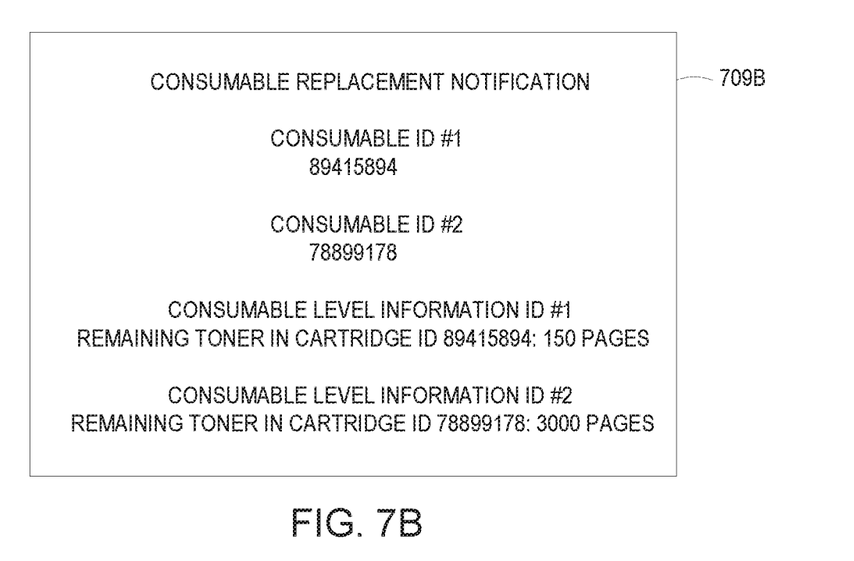

In the example of FIG. 7B, a consumable replacement notification 709B includes consumable identification numbers and consumable level information for a first consumable and a second consumable. In the example of FIG. 7B, the first consumable appears to have been replaced with the second consumable because the consumable identification numbers do not appear to match. In such an example, an imaging device may determine whether to provide additional feedback to a user according to policies, permissions, and/or restrictions available to the imaging device. In some examples, the additional feedback provided by an imaging device may include a warning that a non-empty consumable was removed and should be returned to the imaging device. In other examples, the additional feedback provided by an imaging device may include an estimated fee for premature removal of a non-empty consumable. In such a manner, the additional feedback may incentivize a user to use a consumable until it is empty rather than prematurely replacing the consumable with a replacement consumable. In some examples, the additional feedback may be received via a communication engine from a remote system. In examples, the imaging device may provide the additional feedback via a component controlled by a feedback engine.

Referring again to FIG. 2, in examples, speaker 142 of component 140 may provide feedback to a user. In examples, feedback engine 132 may control speaker 142 to provide feedback when an actuation event 105 is detected or received in imaging device 100. In examples, speaker 142 may output an audible signal. In examples, the audible signal may be a sound such as a bell, a tone, a beep, etc. to gain a user's attention. In other examples, the audible signal may include audio instructions to a user to inform them that consumable 110 is locked. In some examples, the audible signal may instruct or indicate how to obtain additional information about the locked state. For example, the audible signal may instruct a user to look at display 144 or other parts of an imaging device containing further instructions. In yet other examples, the audible signal may include a combination of sounds and audible instructions.

Figure 3A:
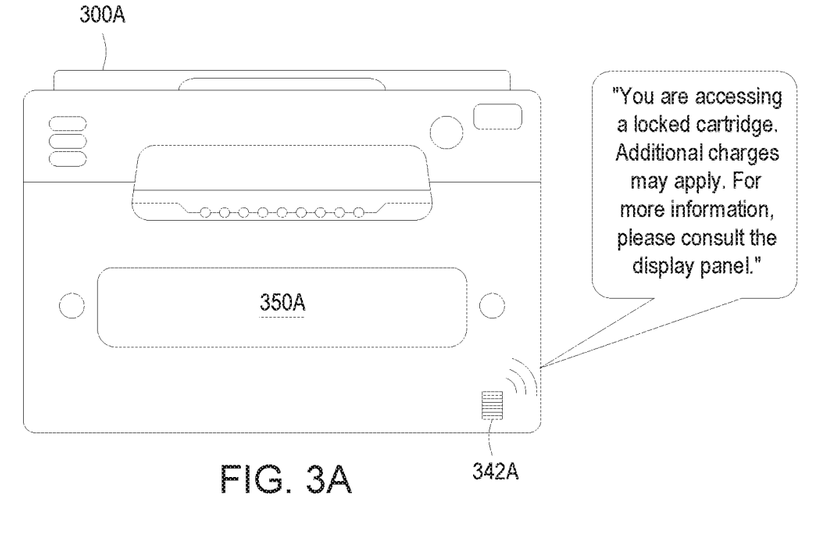
FIGS. 3A-3B are examples of a speaker of an example imaging device.
Figure 3B:
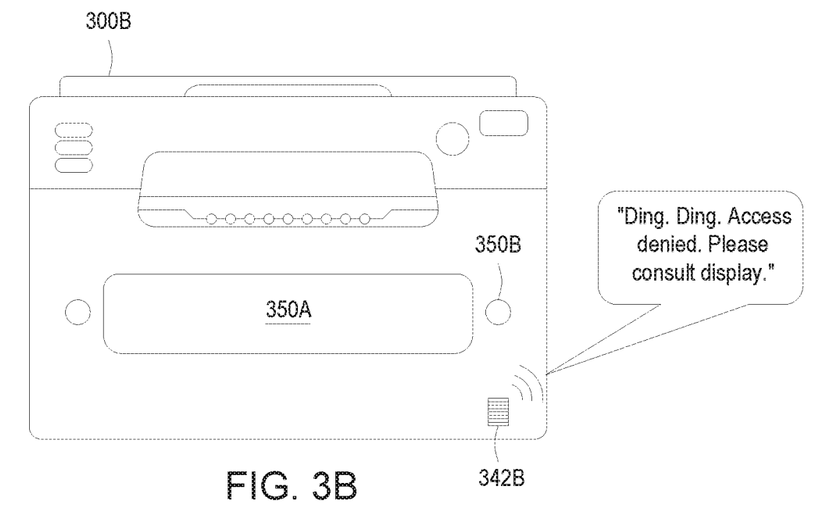

FIGS. 3A-3B are examples of speaker in an example imaging device. In the example of FIG. 3A, an imaging device 300A is shown with a door 350A to access a consumable. In an example, when a user attempts to access door 350A (i.e., an actuation event), a feedback engine (not shown) of imaging device 300A may control speaker 342A to emit an audible signal. In the example of FIG. 3A, a lock control engine (not shown) may determine the actuation event is approved. In such an example, the audible signal may recite, "You are accessing a locked consumable. Additional charges may apply. For more information, please consult the display panel." In the example of FIG. 3B, an imaging device 300B is shown with a button 350B to access door 350A to a consumable. In an example, when a user actuates button 350B (i.e., an actuation event), a feedback engine (not shown) of imaging device 300B may control a speaker 342B to emit an audible signal. In the example of FIG. 3B, a lock control engine (not shown) may determine the actuation event is not approved to provide access to a consumable. In such an example, the audible signal may be a warning sound followed by an audible instruction, such as, "Access denied. Please consult display."

Referring again to FIG. 2, in examples, display 144 of component 140 may provide feedback to a user. In examples, feedback engine 132 may control display 144 to provide feedback when an actuation event 105 is detected or received in imaging device 100. In examples, display 144 may display a visual signal, such as a graphical user interface, through which a user may receive instructions and/or prompts to interact with imaging device 100. In examples, display 144 may display a graphical representation of a button on a graphical user interface to request access to consumable 110. In other examples, display 144 may display via a graphical user interface information regarding a locked state of consumable 110. For example, locked state information may explain that consumable 110 is locked, why consumable 110 is locked, and/or how to access consumable 110.

Figure 4A:
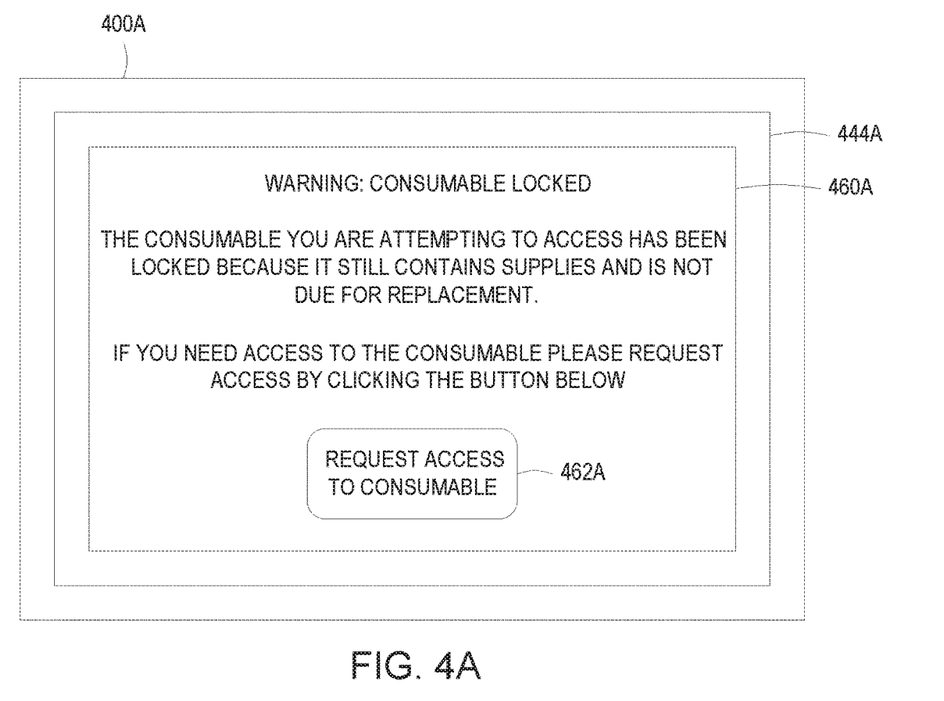
FIGS. 4A-4B are examples of layouts of a display of an example imaging device.

FIGS. 4A-4B are examples of layouts of a display of an example imaging device. In the example of FIG. 4A, an actuation event has been received by a feedback engine (not shown) of imaging device 400A. In response to the actuation event, the feedback engine controls a display 444A to display a graphical user interface 460A. In the example of FIG. 4A, graphical user interface 460A depicts a warning that a consumable is locked. The warning includes a graphical representation of a button 462A to request access to a locked consumable. In examples, the content of the warning may be determined according to a service contract or subscription plan.

Figure 4B:
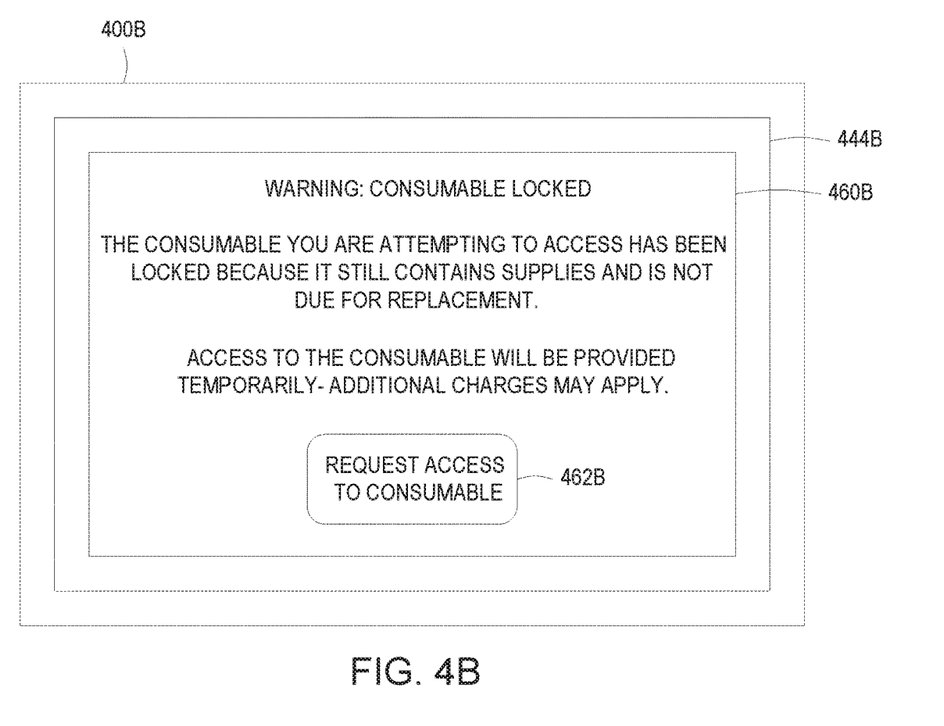

In the example of FIG. 4B, an actuation event has been received by a feedback engine (not shown) of imaging device 400B. In response to the actuation event, the feedback engine controls a display 444B to display a graphical user interface 460b. In the example of FIG. 4B, graphical user interface 460B depicts a warning that a consumable is locked. The warning includes a graphical representation of a button 462B to request access to a locked consumable. In the example of FIG. 4B, the warning of graphical user interface 460B indicates access will be provided to the locked consumable and that an additional charge may apply. In such an example, a lock control engine (not shown) of imaging device 460B may determine the actuation event is approved to access a locked consumable. If the user actuates button 462B, imaging device 400B may disengage a lock to provide access to a consumable thereto. In such an example, if a consumable is returned to imaging device 400B after being removed, an authentication engine may determine whether the consumable has been replaced. If a new consumable is detected by authentication engine in imaging device 400B, a communication engine (not shown) may provide a consumable replacement notification, as described with reference to FIGS. 7A-7B, to a remote system with consumable level information of the current and previously installed consumables. In such an example, the remote system or an administrator thereof may determine whether to charge a user for any premature replacement of a consumable. In other examples, imaging device 400B may determine whether to charge a user for any premature replacement of a consumable. In some examples, the feedback engine of imaging device 400B may control display 444B to display, via a graphical user interface, additional feedback information regarding the replacement of a consumable.

Referring again to FIG. 2, in examples, light source 146 of component 140 may provide feedback to a user. In examples, feedback engine 132 may control light source 146 to provide feedback when an actuation event 105 is detected or received in imaging device 100. In examples, light source 146 may be any type of light emitting device to emit light to be visible to a user. In examples, light source 146 may blink or change color to indicate to a user that consumable 110 is locked. In some examples, light source 146 may illuminate a cutout or other indicator of a locked status of consumable 110. In some such examples, light source 146 may illuminate an indicator to instruct a user to look at display 144 or other parts of an imaging device containing further instructions. In other such examples, light source 146 may illuminate a button or other physical object to provide access to a consumable.

Figure 5A:
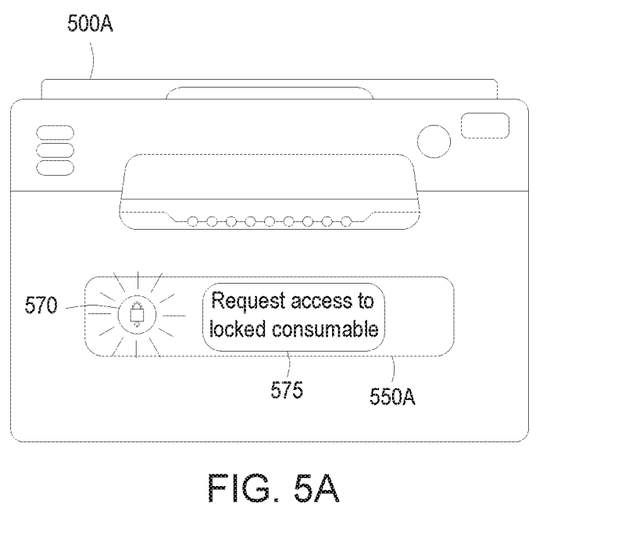
FIGS. 5A-5B are examples of a light source of an example imaging device.

FIGS. 5A-5B are examples of a light source of an example imaging device. In the example of FIG. 5A, an imaging device 500A is shown with a door 550A to access a consumable. In an example, when a user attempts to access door 550A (i.e., an actuation event), a feedback engine (not shown) of imaging device 500A may control a light source (not shown) to illuminate a lock and key symbol 570 and/or a button 575 disposed on the door 550A. In examples, button 575 may indicate actuation of button 575 is a request to access a locked consumable. In an example of FIG. 5A, a lock control engine (not shown) may determine the actuation event is not approved to provide access to a consumable. In such an example, the feedback engine of imaging device 500A may control the light source to illuminate the lock and key symbol 570. In another example of FIG. 5A, a lock control engine (not shown) may determine the actuation event is approved to provide access to a consumable. In such an example, the feedback engine of imaging device 500A may control the light source to sequentially or concurrently illuminate lock and key symbol 570 and button 575. In such examples, a user may be informed that a consumable is locked and provided with the ability to request access to the consumable from a location disposed on door 550A to access a consumable of imaging device 500A.

Figure 5B:
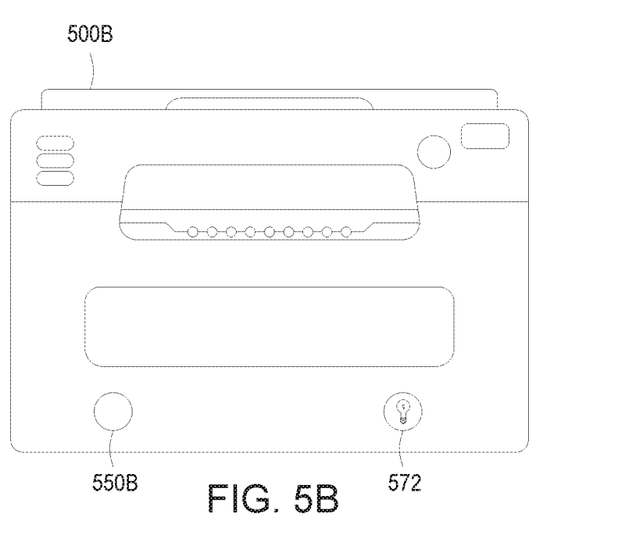

In the example of FIG. 5B, an imaging device 500B is shown with a button 550B to access a consumable. In an example, when a user actuates button 550B (i.e., an actuation event), a feedback engine (not shown) of imaging device 500B may control a light source 572 to blink or illuminate in response to detection or receipt of an actuation event. In the example of FIG. 5B, light source 572 may illuminate a specific color or remain solidly illuminated when a consumable is in a locked state. In response to actuation of button 550B, the colors or illumination pattern of light source 572 may change. For example, light source 572 may blink at a certain frequency in response to an actuation event when a consumable is in a locked state and may then blink at a different frequency if the actuation event is approved by a lock control engine of imaging device 500B. In another example, light source 572 may be red colored in response to an actuation event when a consumable is in a locked state and may change colors to green if the actuation event is approved by a lock control engine of imaging device 500B.

Referring again to FIG. 2, in examples, vibrating component 148 may be used to provide feedback to a user. In some examples, a vibrating component may be vibration motor, micro-vibration motor, etc. In examples, feedback engine 132 may control vibrating component 148 to provide feedback when an actuation event 105 is received or detected in imaging device 100. In examples, vibrating component 148 may provide a haptic signal to a user to indicate a locked state of consumable 110. In such an example, vibrating component 148 may vibrate to indicate to a user that consumable 110 is locked. For example, vibrating component 148 may be disposed to vibrate a mechanism used to access consumable 110 such as a door, a handle, a button, etc. In examples, the frequency, duration, or strength of vibration may alter according to access being granted or denied to a locked consumable by lock control engine 134.

Figure 6A:
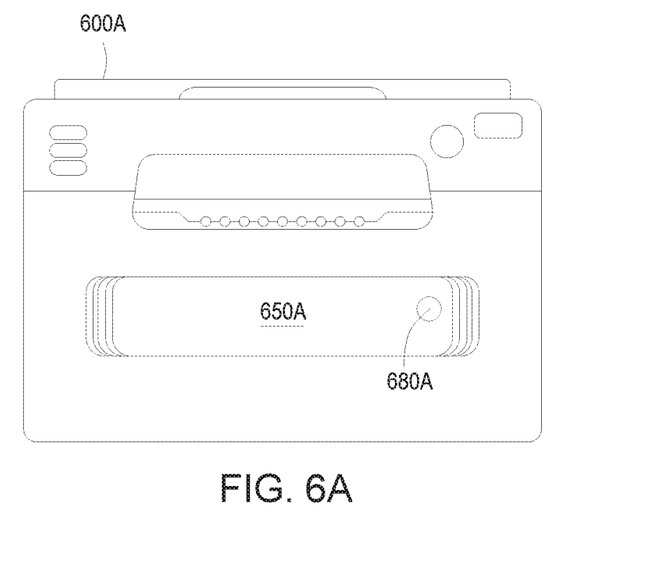
FIGS. 6A-6B are examples of a vibrating components of an example imaging device.

FIG. 6A-6B are examples of a vibrating components of an example imaging device. In the example of FIG. 6A, imaging device 600A is shown with a door 650A to access a consumable and a vibrating component 680A (depicted in dashed lines) disposed inside or behind door 650A to vibrate door 650A, In an example of FIG. 6A, vibrating component 680A may vibrate in response to an attempt to open door 650A (i.e., an actuation event) when a consumable is in a locked state. In such an example, when a lock control engine of imaging device 650A determines the actuation event is approved, vibrating component 680A may cease vibrating to indicate access has been granted to door 650A.

Figure 6B:
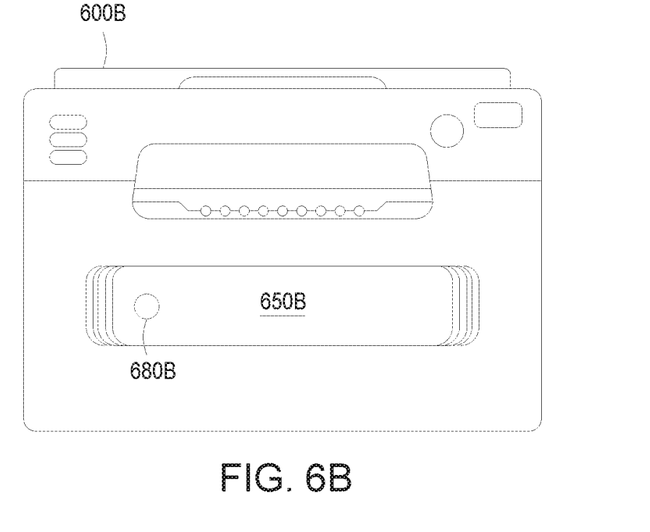

In the example of FIG. 6B, imaging device 600B is shown with a handle 650B to access a consumable and a vibrating component 680B (depicted in dashed lines) disposed inside or behind handle 650B to vibrate handle 650B. In the example of FIG. 6B, a feedback engine may control vibrating component 680B to vibrate door 650B in response to an actuation event on handle 650B. In such an example, when a lock control engine of imaging device 650B determines the actuation event is not approved, vibrating component 680B may vibrate at a greater strength or frequency to indicate access to a consumable has been denied.

Figure 8A:
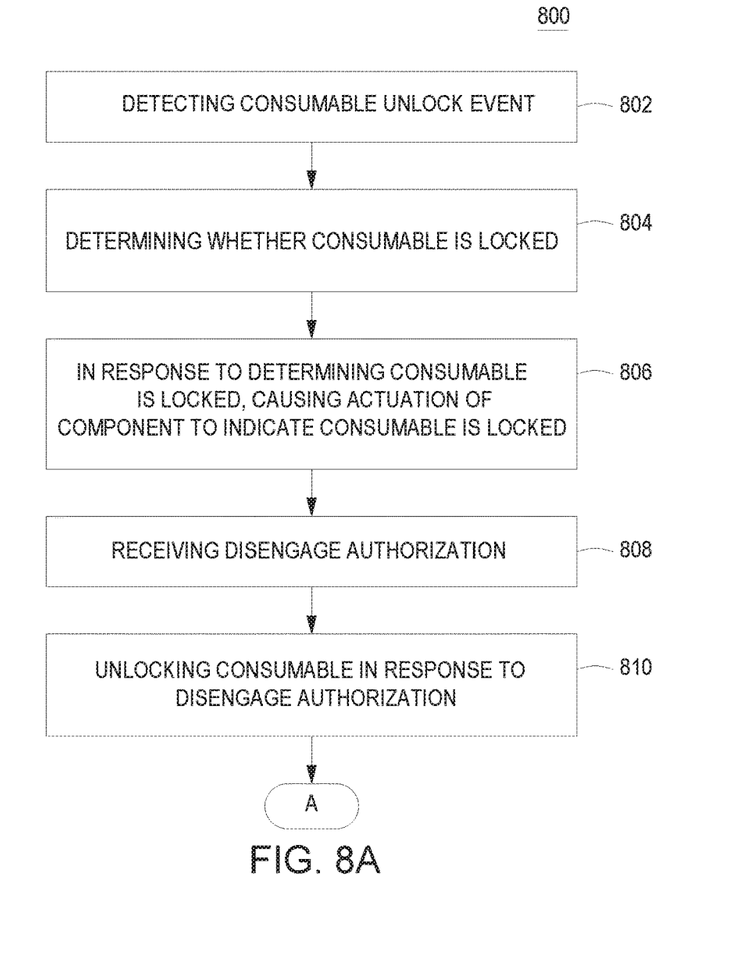
FIGS. 8A-8B are flowcharts of example methods for providing access to a consumable coupled to an imaging device.
Figure 8B:
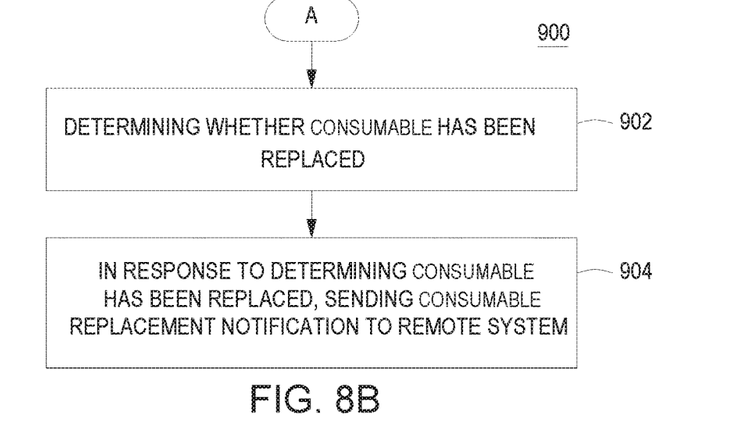

FIGS. 8A-88 are flowcharts of example methods for providing access to a consumable coupled to an imaging device. Although execution of method 800 is described below with reference to imaging device 100 of FIG. 2 described above, other suitable systems for the execution of method 800 can be utilized. Additionally, implementation of method 800 is not limited to such examples.

At 802 of method 800, imaging device 100 may detect a consumable unlock event or actuation event 105. In examples, any number of sensors or detectors may detect an actuation event or consumable unlock event. In an example, the consumable unlock event may be actuation of lock 120 to access consumable 110, for example, by pushing a button as shown in FIG. 5B by way of non-limiting example.

At 804, imaging device 100 may determine whether consumable 110 is locked. In examples, lock 120 may provide an indicator of a locked state to imaging device 100. In other examples, feedback engine 132 may determine a locked state of lock 120.

At 806, in response to a determination that consumable 110 is locked, imaging device 100 may actuate component 140 to indicate consumable 110 is locked. In examples, any of speaker 142, display 144, light source 146, vibrating component 148 or combinations thereof may be actuated to indicate consumable 110 is locked.

At 808, imaging device 100 may receive disengage authorization 107. In examples, lock control engine 134 may determine whether actuation event 105 is approved and may generate or provide disengage authorization 107 when actuation event 105 is approved. In some examples, lock control engine 134 may determine actuation event 105 is approved according to policies, permissions, and/or restrictions stored locally on imaging device 100 or remotely, such as, in remote system 200. In other examples, lock control engine 134 may receive disengage authorization 107 from remote system 200 via communication engine 138.

At 810, imaging device 100 may unlock consumable 110 in response to disengage authorization 107. In such an example, release engine 136 may unlock or disengage lock 120 in response to receipt of disengage authorization 107 from unlock engine 134. In such examples, once lock 120 is disengaged, consumable 120 may be uncoupled from imaging device 100.

FIG. 8B is a flowcharts of an example method 900 for access to a consumable of an imaging device which may be incorporated into the flowchart of FIG. 8A at A. Although execution of the method of FIG. 8B is described below with reference to imaging device 100 of FIG. 2 and the flowchart of FIG. 8A described above, other suitable systems for the execution of the method of FIG. 8B can be utilized. Additionally, implementation of the method of FIG. 8B is not limited to such examples.

At 902 of method 900, imaging device 100 determines whether consumable 110 has been replaced. In examples, authentication engine 139 may determine whether a consumable has been replaced in imaging device 100.

At 904, imaging device 100 may, in response to a determination that the consumable has been replaced, send consumable replacement notification 109 to remote system 200. In examples, consumable replacement notification 109 may include consumable level information to indicate an amount of useful, unused, or remaining printing material in the replaced consumable. In an example, authentication engine 139 may provide consumable replacement notification 109 to communication engine 138 for communication to remote system 200.

Although the flowcharts of FIGS. 8A-8B shows a specific order of performance of certain functionalities, the flowcharts of FIGS. 8A-8B are not limited to that order. For example, the functionalities shown in succession in a flowchart may be performed in a different order, may be executed concurrently or with partial concurrence, or a combination thereof. In some examples, functionalities described herein in relation to FIGS. FIGS. 8A-8B may be provided in combination with functionalities described herein in relation to any of FIGS. 1-7B and 9.

Figure 9:
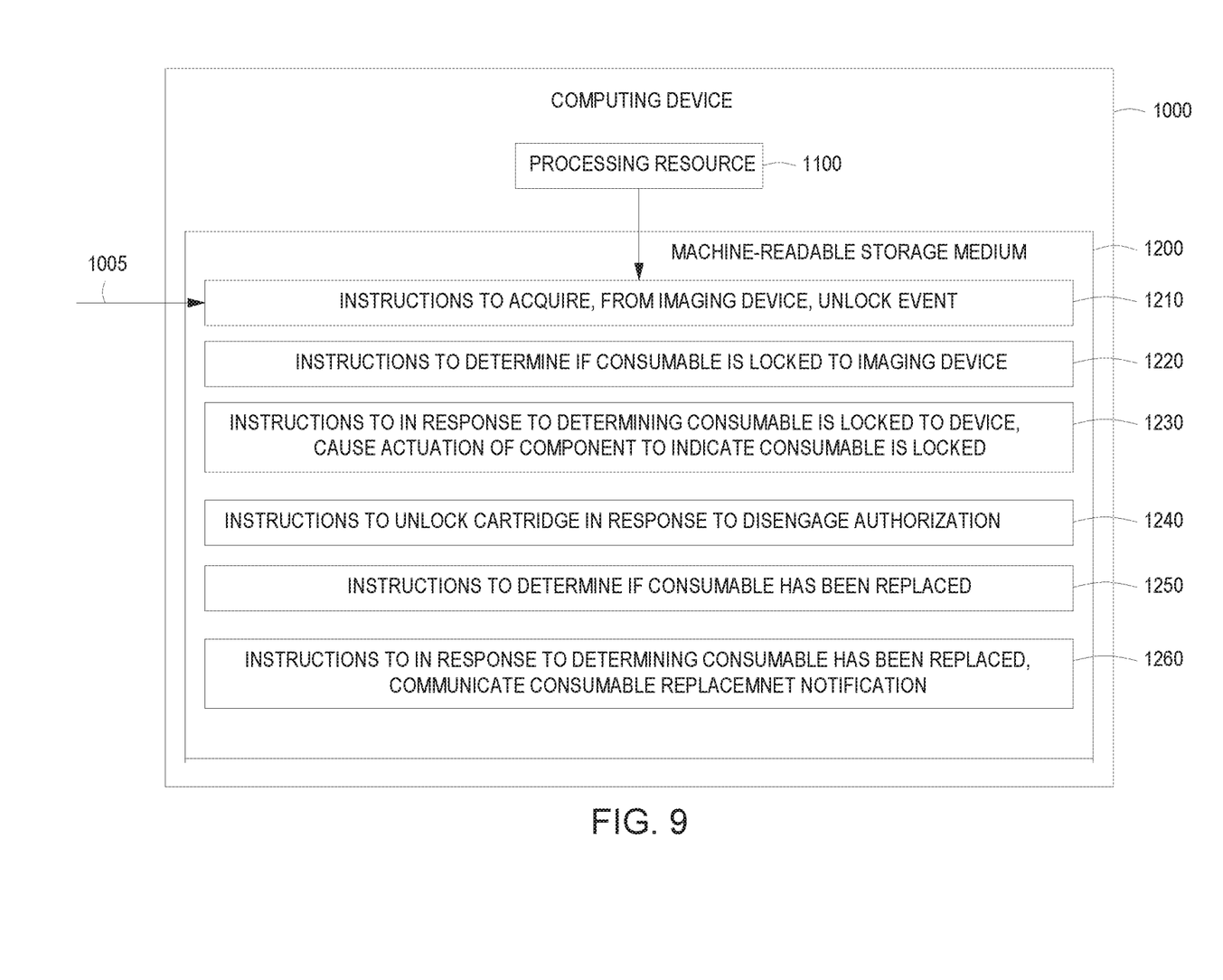
FIG. 9 is an example of a system to unlock a consumable of an imaging device.

FIG. 9 is an example of a system to unlock a consumable. In the example of FIG. 9, computing device 1000 includes a processing resource 1100 and a machine-readable storage medium 1200 comprising (e.g., encoded with) instructions 1210, 1220, 1230, 1240, 1250, and 1260 executable by processing resource 1100. In some examples, storage medium 1200 may include additional instructions. In some examples, instructions 1210, 1220, 1230, 1240, 1250, 1260, and any other instructions described herein in relation to storage medium 1200, may be stored on a machine-readable storage medium remote from but accessible to computing device 1000 and processing resource 1100 (e.g., via a computer network). In some examples, instructions 1210, 1220, 1230, 1240, 1250, and 1260 may be instructions of a computer program, computer application ("app"), agent, or the like, of imaging device 100 of FIGS. 1 and 2. In other examples, the functionalities described herein in relation to instructions 1210, 1220, 1230, 1240, 1250, and 1260 may be implemented as engines comprising any combination of hardware and programming to implement the functionalities of the engines, as described below.

In examples described herein, a processing resource may include, for example, one processor or multiple processors included in a single computing device (as shown in FIG. 9) or distributed across multiple computing devices. A "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution of instructions stored on a machine-readable storage medium, or a combination thereof. Processing resource 1100 may fetch, decode, and execute instructions stored on storage medium 1200 to perform the functionalities described below. In other examples, the functionalities of any of the instructions of storage medium 1200 may be implemented in the form of electronic circuitry, in the form of executable instructions encoded on a machine-readable storage medium, or a combination thereof.

In the example of FIG. 9, instruction 1210 may receive from an imaging device an unlock event 1005. In examples, unlock event 1005 may be actuation of a lock or other mechanism by which to access a consumable of the imaging device.

Instruction 1220 may determine if the consumable is locked to the imaging device. In examples, a consumable may be directly locked to the imaging device via a lock. In other examples, a consumable may be indirectly locked to the imaging device via, for example, a locked door or other access mechanism.

Instruction 1230 may cause, in response to determining that the consumable is locked to the imaging device, actuation of a component to indicate the consumable is locked. In examples, the actuation may selectively actuate a speaker to play an audio file, a display to display a notification of locked state, a light emitting component to emit light, and a vibrating component to vibrate, or combinations thereof.

Instruction 1240 may unlock the consumable in response to the disengage authorization. In examples, the unlocking the consumable may include actuating a lock to provide access to a consumable or any intermediate door or mechanism preventing a user from accessing the consumable.

Instructions 1250 may determine if a consumable has been replaced. In examples, the determination of replacement of a consumable may be made when a consumable is uncoupled from an imaging device and returned thereto.

Instructions 1260 may, in response to determining that the consumable has been replaced, communicate a consumable replacement notification. In examples, the consumable replacement notification includes consumable level indication to indicate an amount of unused deposition material in the consumable. In other examples, the consumable replacement notification comprises instructions to display a notification that a non-empty consumable has been replaced.

All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. An imaging device, comprising:
a lock to secure a consumable to the imaging device;
a feedback engine to selectively generate a signal in response to an actuation event to control a component to indicate the consumable is secured;
a lock control engine to determine if the actuation event is approved to unlock the consumable, the actuation event being approved responsive to one or multiple of:
  the consumable has less than a threshold amount of printing material and is correspondingly considered empty;
  the consumable has more than the threshold amount of printing material and is correspondingly considered non-empty, but has been previously unlocked less than a threshold number of times;
  the consumable has more than the threshold amount of printing material and is correspondingly considered non-empty, and is restricted for unlocking for a specified duration of time before being automatically relocked;
a release engine to disengage the lock in response to approval of the actuation event; and
a communication engine to provide to a remote system a consumable replacement notification when the consumable has been replaced.

2. The imaging device of claim 1, further comprising:
a communication engine to receive a disengage authorization from the remote system, the lock control engine to determine the actuation event is approved according to the disengage authorization.

3. The imaging device of claim 1, further comprising:
an authentication engine to determine whether the consumable has been replaced.

4. The imaging device of claim 3, wherein the consumable replacement notification includes consumable level information to indicate an amount of unused printing material in the consumable.

5. The imaging device of claim 1, wherein the component indicates the consumable is secured by generating signals chosen from an audio signal to be outputted by a speaker, a visual signal to be displayed on a display or provided by a light source, or a haptic signal to be provided by a vibrating component.

6. A method for providing access to a consumable coupled to an imaging device, comprising:
detecting a consumable unlock event;
determining whether the consumable is locked;
in response to determining that the consumable is locked, causing actuation of a component to indicate the consumable is locked;
receiving a disengage authorization responsive to one or multiple of:
the consumable has less than a threshold amount of printing material and is correspondingly considered empty;
the consumable has more than the threshold amount of printing material and is correspondingly considered non-empty, but has been previously unlocked less than a threshold number of times;
the consumable has more than the threshold amount of printing material and is correspondingly considered non-empty, and is restricted for unlocking for a specified duration of time before being automatically relocked; and
unlocking the consumable in response to the disengage authorization; and determining whether the consumable has been replaced; and
in response to determining that the consumable has been replaced, sending a consumable replacement notification to a remote system, wherein the consumable replacement notification includes consumable level information to indicate an amount of unused printing material in the replaced consumable.

7. The method of claim 6, wherein the unlock event includes actuation of a lock to access the consumable.

8. The method of claim 6, wherein the component includes a speaker, a display, a light source, a vibrating component, and combinations thereof.

9. The method of claim 6, wherein the disengage authorization is received from a remote system via a communication unit.

10. The method of claim 6, wherein the disengage authorization is received from the imaging device.

11. A non-transitory computer-readable medium, comprising instructions to unlock a consumable that when read and executed by a processor cause the processor to:
receive, from an imaging device, an unlock event;
determine if the consumable is locked to the imaging device;
in response to determining that the consumable is locked to the imaging device, cause actuation of a component to indicate the consumable is locked;
unlock the consumable in response to a disengage authorization responsive to one or multiple of:
the consumable has less than a threshold amount of printing material and is correspondingly considered empty;
the consumable has more than the threshold amount of printing material and is correspondingly considered non-empty, but has been previously unlocked less than a threshold number of times;
the consumable has more than the threshold amount of printing material and is correspondingly considered non-empty, and is restricted for unlocking for a specified duration of time before being automatically relocked;
determine if the consumable has been replaced; and
in response to determining that the consumable has been replaced, communicate a consumable replacement notification.

12. The computer-readable medium of claim 11, wherein the instructions to actuate the component includes instructions to selectively actuate a speaker, a display, a light emitting component, and a vibrating component, or combinations thereof.

13. The computer-readable medium of claim 11, wherein the consumable replacement notification includes consumable level indication to indicate an amount of unused printing material in the consumable.

14. The computer-readable medium of claim 11, wherein the instructions to communicate the consumable replacement notification includes instructions to display a notification that a non-empty consumable has been replaced.

* * * * *